J. LAWRENCE.
CUTTER-HEADS.
No. 179,926.  Patented July 18, 1876.
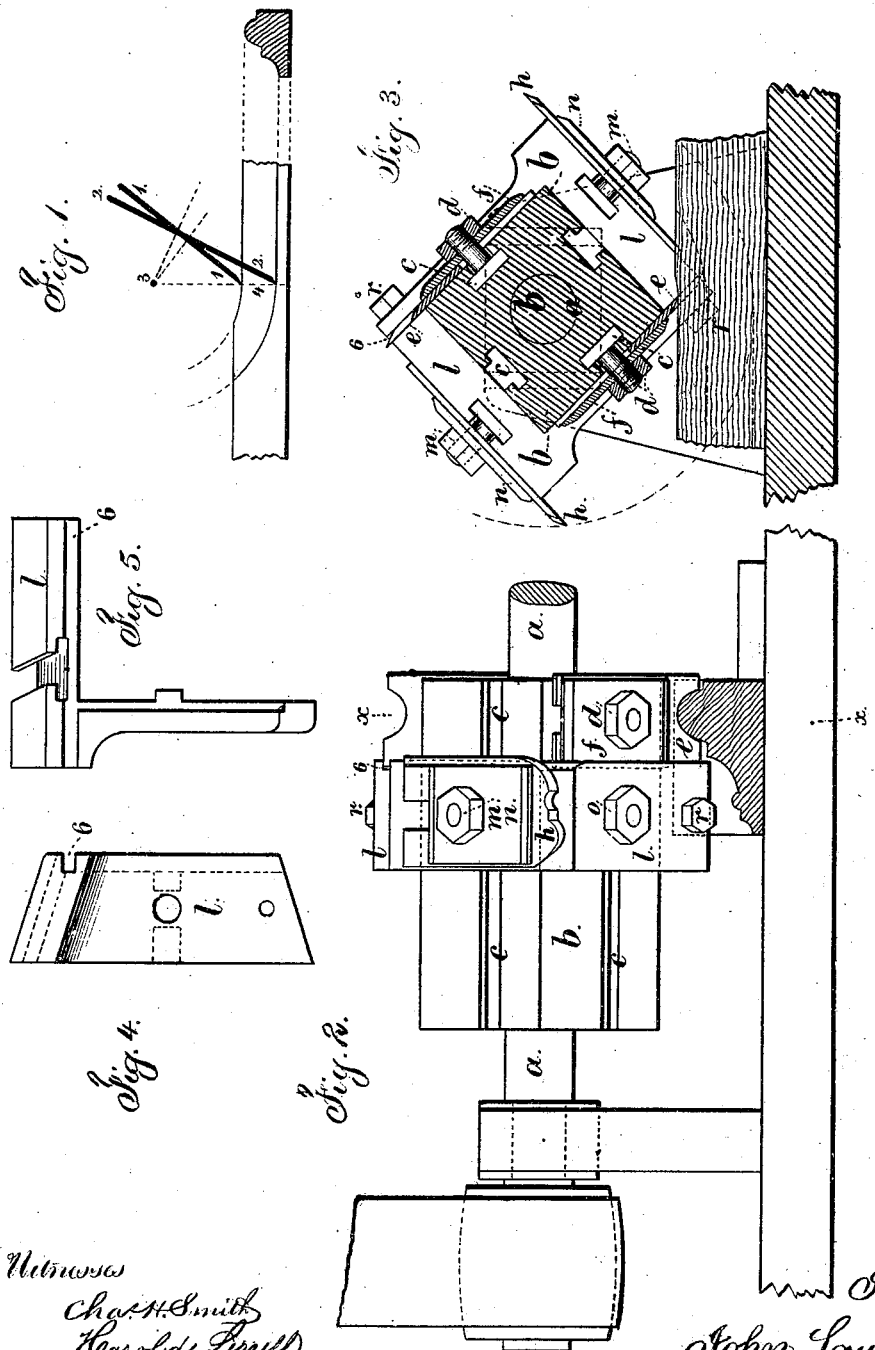
Witnesses
Chas. H. Smith
Harold Serrell
Inventor
John Lawrence
per L. W. Serrell
Atty.

UNITED STATES PATENT OFFICE.

JOHN LAWRENCE, OF NEW YORK, N. Y.

IMPROVEMENT IN CUTTER-HEADS.

Specification forming part of Letters Patent No. 179,926, dated July 18, 1876; application filed March 17, 1876.

*To all whom it may concern:*

Be it known that I, JOHN LAWRENCE, of the city and State of New York, have invented an Improvement in Cutter-Heads, of which the following is a specification:

In practice it is found that the cutter of a planing-machine will work to the best advantage when the same stands at about forty-five degrees to the finished surface, similar to a hand-plane iron.

With the rotary cutter in a flat planing-machine, this object is accomplished with comparative ease, but with cutters for molding or planing machines, great difficulty exists in making smooth work, because the surface of the cutter-head is nearly square. The short members plane properly, leaving the high parts of the molding smooth, but the long portions of the cutter will scrape, leaving the low parts of the molding rough.

This is illustrated in the diagram, Fig. 1, in which the line 1 1 shows the angle at which the finishing cut takes place at the upper part of the molding, and the line 2 2 represents the angle at which the finishing cut takes place, with the longer part of the same cutter, in cutting the deeper parts of the molding, for it must be remembered that, with an undulating cutter, with the edge at different distances from the center of rotation 3, the longer parts 2 of the cutter reach the vertical plane 4, passing through the axis of rotation before the shorter parts of the edge; hence the longer members are more nearly vertical.

My invention is made for preventing this scraping action; and consists in a cutter-head, made with offsets to receive and support the cutters at different distances from the center of the shaft, so that the angle at which the cutters stand to the wood in finishing the surface will be about forty-five degrees, and at the same time the cutters can be used for different styles of moldings.

In the drawing, Figure 2 is a side view of the cutter-head and cutters. Fig. 3 is a cross-section of the shaft and cutter-head at the line $x\,x$.

The shaft $a$ is supported in suitable bearings and driven by competent power. The head $b$ is rectangular, and provided with the grooves $c$, receiving the heads of the bolts $d$, by which the cutters $e$ are attached. There is to be a cap-plate, $f$, behind each cutter, as usual. The cutter-head is of a size to receive the cutter $e$, with its cutting-edge near the angle of the head, and this cutter forms the highest part of the molding.

The cutter $h$, that planes the lowest part of the molding, is upon a larger portion of the cutter-head, so as to stand at about forty-five degrees to the surface of the molding while finishing the same.

It is generally preferable to employ movable cutter-stocks upon one cutter-head, with parallel faces, as seen at $l$, so as to increase the diameter of the cutter-head at the place required for receiving the second cutter or cutters, with their attaching-bolts $m$ and cap-plates $n$, and these cutter-stocks are to be bolted to the cutter-head by the bolts $o$; and it is preferable to make these stocks in a V-form to rest against two surfaces of the cutter-head, and bolt them together at the angles by the screws $r$.

By making grooves in the edges of these cutter-stocks, as at 6, the edges of the cutters $e$ can be fitted in such grooves and supported by the stock projecting over the cutter, so as to prevent any vibration of the cutter itself.

In cases where the cutter $h$ is a single curve, and longer at one edge than the other, it is preferable to make the movable cutter-stock with an inclined surface, as seen in Figs. 4 and 5, so that the angle at which the cut takes place will be about forty-five degrees, as aforesaid, and, in addition, the cutting-edge will have a drawing action as it cuts the wood.

The effect heretofore set forth in planing the molding with the cutters at the proper angle to the surface will be obtained by the use of square sections or rings of different size, adapted to receive the cutting-tools, and clamped upon the mandrel. In this case each square section can be grooved in its face at the surface of the adjacent section, so as to receive the edge of the cutter that is clamped to such section.

This improvement lessens the power required for running the machine, because the cutting operation is performed to better advantage.

I claim as my invention—

A cutter-stock, bolted upon the cutter-head and receiving upon it a cutter, in combination with a cutter, bolted to the cutter-head and supported at one edge by the cutter-stock projecting over the edge of the cutter, substantially as set forth.

Signed by me this 14th day of March, A. D. 1876.

JOHN LAWRENCE.

Witnesses:
GEO. T. PINCKNEY,
CHAS. H. SMITH.